United States Patent
Kim

(10) Patent No.: US 10,803,506 B2
(45) Date of Patent: Oct. 13, 2020

(54) INTEREST INFORMATION ANALYSIS METHOD USING SCROLL PATTERN AND APPARATUS USING THE SAME

(71) Applicant: SK Planet Co., Ltd., Seongnam-si, Gyeonggi-do (KR)

(72) Inventor: Ju-Tae Kim, Seongnam-si (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 492 days.

(21) Appl. No.: 15/377,392

(22) Filed: Dec. 13, 2016

(65) Prior Publication Data

US 2017/0364986 A1 Dec. 21, 2017

(30) Foreign Application Priority Data

Jun. 15, 2016 (KR) .................. 10-2016-0074505

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0625* (2013.01); *G06Q 30/0201* (2013.01); *G06Q 30/0633* (2013.01)

(58) Field of Classification Search
CPC .............. G06Q 30/00; G06Q 30/0601; G06Q 30/0633; G06Q 30/0641; G06Q 30/0201; G06Q 30/0625
See application file for complete search history.

(56) References Cited

U.S. PATENT DOCUMENTS 8,660,912 B1 * 2/2014 Dandekar .............. G06Q 30/06 705/26.1
9,329,759 B1 * 5/2016 Hill ..................... G06F 3/04842
(Continued)

FOREIGN PATENT DOCUMENTS

CN 102667842 9/2012
CN 104956301 9/2015
(Continued)

OTHER PUBLICATIONS

Beymer, David, and Daniel M. Russell. "WebGazeAnalyzer: a system for capturing and analyzing web reading behavior using eye gaze." CHI'05 extended abstracts on Human factors in computing systems. 2005. (Year: 2005).*
(Continued)

*Primary Examiner* — Christopher B Seibert
(74) *Attorney, Agent, or Firm* — Fenwick & West LLP

(57) ABSTRACT

Disclosed herein are an interest information analysis method and an apparatus using the same. The method and apparatus are configured to extract a target screen from a user terminal in consideration of scrolling speed, calculate a degree of interest in content information included in the target screen in consideration of multiple split screens corresponding to the target screen and a user touch area, and analyze information about interest of the user by arranging multiple pieces of content information acquired from the user terminal based on the degree of interest. Accordingly, information about interest of the user or a field of interest to the user may be analyzed without referring to a definite intention expressed by the user.

8 Claims, 8 Drawing Sheets

(56) References Cited

U.S. PATENT DOCUMENTS

| | | | | |
|---|---|---|---|---|
| 2007/0106570 A1* | 5/2007 | Hartman | ............... | G06Q 30/06 |
| | | | | 705/26.2 |
| 2009/0037291 A1* | 2/2009 | Dawson | ............. | G06Q 30/0603 |
| | | | | 705/27.2 |
| 2010/0114654 A1* | 5/2010 | Lukose | ................. | G06Q 30/00 |
| | | | | 705/14.54 |
| 2012/0136756 A1* | 5/2012 | Jitkoff | ................ | G06F 3/04817 |
| | | | | 705/27.1 |
| 2012/0310587 A1* | 12/2012 | Tu | ........................... | G01D 1/16 |
| | | | | 702/141 |
| 2014/0164991 A1* | 6/2014 | Kim | ..................... | G06F 3/0486 |
| | | | | 715/794 |
| 2014/0258890 A1* | 9/2014 | Kamdar | ............... | G06F 3/0485 |
| | | | | 715/760 |
| 2015/0350294 A1* | 12/2015 | Takami | ............. | G06Q 30/0201 |
| | | | | 715/760 |

FOREIGN PATENT DOCUMENTS

| | | |
|---|---|---|
| EP | 2495664 A1 | 9/2012 |
| KR | 10-2008-0075584 A | 8/2008 |
| KR | 10-2014-0040318 A | 4/2014 |
| WO | 2012/105196 A1 | 8/2012 |

OTHER PUBLICATIONS

European Search Report dated Feb. 7, 2017 corresponding to European Patent Application No. EP 16203409.4.

* cited by examiner

| RANKING | DEGREE OF INTEREST | CONTENT | RELATED PRODUCT | ... |
|---|---|---|---|---|
| 1 | 39 | A | A' | ... |
| 2 | 34 | B | B' | ... |
| 3 | 27 | C | C' | ... |
| . | . | . | . | |
| . | . | . | . | |
| . | . | . | . | |

INTEREST INFORMATION ANALYSIS METHOD USING SCROLL PATTERN AND APPARATUS USING THE SAME

CROSS REFERENCE TO RELATED APPLICATION

This application claims the benefit of Korean Patent Application No. 10-2016-0074505, filed Jun. 15, 2016, which is hereby incorporated by reference in its entirety into this application.

BACKGROUND OF THE INVENTION

1. Technical Field

The present invention relates generally to technology for analyzing a matter of interest to a user and, more particularly, to an interest information analysis method using a scroll pattern and an apparatus using the method, which can analyze potential interest or potential demand without referring to a definite intention expressed by the user by acquiring interest information using scrolling speed on a user terminal.

2. Description of the Related Art

In the past, information about a product or content that is of interest to a user has been collected using a scheme for analyzing the properties of stored content or a stored product when the user stores selected content or a selected product in user storage space. For example, the properties of products have been analyzed based on information about a product placed in a cart or information about a product actually purchased on Internet shopping mall sites, and thus it has been possible to predict the field of interest to the user.

Further, even if a separate product is not stored or purchased, information about interest of the user (user interest information) has been analyzed by analyzing the properties of products in which the user expresses his or her interest. For example, the expression of the user's interest, such as by clicking a specific product in a product list and viewing details of the product, or by posting reviews of the product, giving evaluation scores, or sharing information about the product on a Social Network Service (SNS) site, is analyzed. Furthermore, such user interest information may be analyzed by analyzing search keywords entered by the user. This is a method for analyzing the degree of interest in a specific product by analyzing morphemes of each keyword entered by the user into a search engine.

The analysis methods, described above, are methods for analyzing definite intentions expressed by respective users, and may be regarded as schemes that are a great help in analyzing current interest and demand and predicting future demand. In practice, these methods have come to be widely used.

However, these conventional technologies are restricted in that a definite intention (i.e. interest) expressed by each user is essentially required, and have limitations in analyzing potential interest or potential demand that is not concretely expressed. In connection with this, Korean Patent Application Publication No. 10-2008-0075584 discloses a technology related to "A setting and analyzing method for rate of interest part in web page and A system for the same."

SUMMARY OF THE INVENTION

Accordingly, the present invention has been made keeping in mind the above problems occurring in the prior art, and an object of the present invention is to provide a method for analyzing information or a field of interest to a user without referring to a definite intention expressed by the user.

Another object of the present invention is to provide a method for analyzing potential interest or potential demand by analyzing the behavior pattern of a user.

A further object of the present invention is to provide a method for detecting information about interests of users who avoid expressing a definite intention.

In accordance with an aspect of the present invention to accomplish the above objects, there is provided an interest information analysis method using a scroll pattern, including extracting a target screen from a user terminal in consideration of scrolling speed; calculating a degree of interest in content information included in the target screen in consideration of multiple split screens corresponding to the target screen and a user touch area; and analyzing information about interest of the user by arranging multiple pieces of content information acquired from the user terminal based on the degree of interest.

Calculating the degree of interest may be configured to assign respective interest scores to multiple valid split screens, which do not correspond to the user touch area, among the multiple split screens, and to calculate the degree of interest based on an interest score corresponding to at least one valid split screen including the content information, among the multiple valid split screens.

Calculating the degree of interest may be configured to when the content information is simultaneously included in two or more valid split screens, among the multiple valid split screens, calculate content area ratios for the two or more respective valid split screens, and calculate the degree of interest by summing values obtained by multiplying the content area ratios by interest scores for the two or more respective valid split screens.

Calculating the degree of interest may be configured to assign a highest interest score to a valid split screen located at a center, among the multiple valid split screens, and assign higher interest scores to valid split screens that are closer to the valid split screen located at the center.

Calculating the degree of interest may be configured to divide the target screen in conformity with a preset number of divisions according to a size of a display of the user terminal such that division is performed in a direction perpendicular to a scroll direction.

Extracting the target screen is configured to extract a display screen at a point where the scrolling speed is decreased to a preset reference speed or less as the target screen.

Extracting the target screen may include, when the scrolling speed is 0, analyzing a behavior pattern of the user based on at least one sensor included in the user terminal; and determining whether to extract the display screen as the target screen based on the behavior pattern.

The at least one sensor may include at least one of an acceleration sensor, a gyro sensor, a proximity sensor, an illuminance sensor, and a screen change sensor.

Calculating the degree of interest may be configured to, when the user terminal is a terminal that does not support a touch input, assign a highest interest score to a split screen located at a center, among the multiple split screens, and assign higher interest scores to split screens that are closer to the split screen located at the center.

In accordance with another aspect of the present invention to accomplish the above objects, there is provided an interest information analysis apparatus using a scroll pattern, including a target screen extraction unit for extracting a target screen from a user terminal in consideration of scrolling speed; a degree-of-interest calculation unit for calculating a degree of interest in content information included in the target screen in consideration of multiple split screens corresponding to the target screen and a user touch area; and an interest information analysis unit for analyzing information about interest of the user by arranging multiple pieces of content information acquired from the user terminal based on the degree of interest.

The degree-of-interest calculation unit may be configured to assign respective interest scores to multiple valid split screens, which do not correspond to the user touch area, among the multiple split screens, and to calculate the degree of interest based on an interest score corresponding to at least one valid split screen including the content information, among the multiple valid split screens.

The degree-of-interest calculation unit may be configured to when the content information is simultaneously included in two or more valid split screens, among the multiple valid split screens, calculate content area ratios for the two or more respective valid split screens, and calculate the degree of interest by summing values obtained by multiplying the content area ratios by interest scores for the two or more respective valid split screens.

The degree-of-interest calculation unit may be configured to assign a highest interest score to a valid split screen located at a center, among the multiple valid split screens, and assign higher interest scores to valid split screens that are closer to the valid split screen located at the center.

The degree-of-interest calculation unit may be configured to divide the target screen in conformity with a preset number of divisions according to a size of a display of the user terminal such that division is performed in a direction perpendicular to a scroll direction.

The target screen extraction unit may be configured to extract a display screen at a point where the scrolling speed is decreased to a preset reference speed or less as the target screen.

The target screen extraction unit may be configured to, when the scrolling speed is 0, analyze a behavior pattern of the user based on at least one sensor included in the user terminal, and determine whether to extract the display screen as the target screen based on the behavior pattern.

The at least one sensor may include at least one of an acceleration sensor, a gyro sensor, a proximity sensor, an illuminance sensor, and a screen change sensor.

The degree-of-interest calculation unit may be configured to, when the user terminal is a terminal that does not support a touch input, assign a highest interest score to a split screen located at a center, among the multiple split screens, and assign higher interest scores to split screens that are closer to the split screen located at the center.

BRIEF DESCRIPTION OF THE DRAWINGS

The above and other objects, features and advantages of the present invention will be more clearly understood from the following detailed description taken in conjunction with the accompanying drawings, in which:

FIG. 6 is a diagram showing an example of interest information according to the present invention;

DESCRIPTION OF THE PREFERRED EMBODIMENTS

Figure 1:
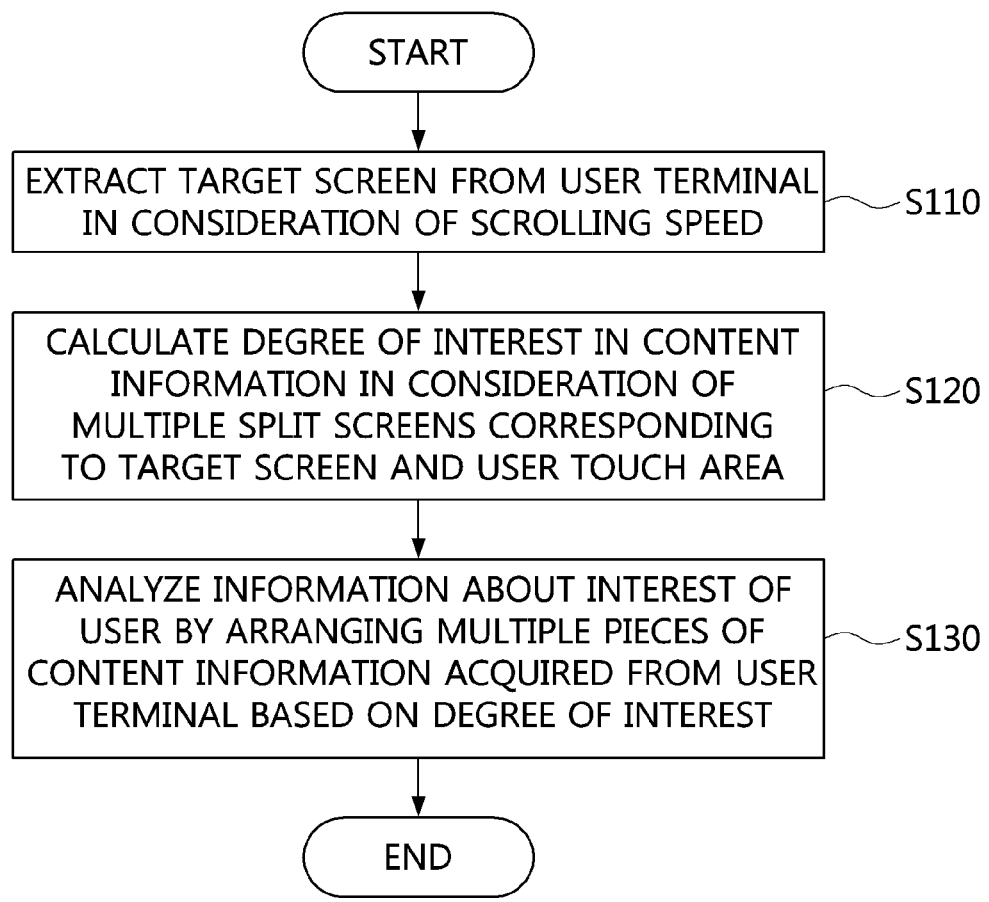
FIG. 1 is an operation flowchart showing an interest information analysis method using a scroll pattern according to an embodiment of the present invention.

Embodiments of the present invention will be described in detail with reference to the attached drawings. However, in the following description and drawings, detailed descriptions of known functions or configurations which are deemed to make the gist of the present invention obscure will be omitted. Further, it should be noted that the same reference numerals are used to designate the same or similar elements throughout the drawings.

Prior to the following detailed description of the present invention, it should be noted that the terms and words used in the specification and the claims should not be construed as being limited to ordinary meanings or dictionary definitions, and that an inventor can appropriately define the concepts of terms in order to best describe his or her invention. Meanwhile, the embodiments described in the present specification and the configurations illustrated in the drawings are merely preferable embodiments and do not exhaustively present the technical spirit of the present invention. Accordingly, it should be appreciated that there may be various equivalents and modifications that can replace the embodiments and the configurations at the time at which the present application is filed. Further, terms such as "first" or "second" may be used to describe various components, and are merely used to distinguish one component from other components, but are not intended to limit the components.

FIG. 1 is an operation flowchart showing an interest information analysis method using a scroll pattern according to an embodiment of the present invention.

Generally, in order to provide customized service to each user, information about a product or content of interest to a user may be collected from the computer or mobile device of the user. This collection technology is intended to provide the product or content having a probability of being of interest to the user based on the collected information. Recently, most service providers have come to utilize this technology.

That is, this is intended to collect information about interest of the user (user interest information) and to provide a product expected to be purchased by the user. For example, it is possible to analyze the properties of content or the product stored by the user in the user terminal, collect interest information, and recommend products similar to the user interest information.

However, this technology may collect interest information only when the user expresses his or her interest. For example, as well as in the case where the information stored in the user terminal is utilized, as described above, in the case where product inquiry records are utilized or information shared on an SNS is used, or in the case where a search keyword is used, information may be collected only when the user expresses his or her interest.

Therefore, it may be difficult to precisely provide such a service to a user who avoids positively expressing his or her interest. Further, there is a limitation in that, even if the user does not positively express his or her interest, it is impossible to collect information of potential interest.

In order to solve this problem, the present invention is intended to present a method for analyzing information about content or a product of potential interest to the user by analyzing a scroll pattern while the user is viewing a content or product list.

Referring to FIG. 1, the interest information analysis method using a scroll pattern according to the embodiment of the present invention extracts a target screen from a user terminal in consideration of scrolling speed at step S110.

Here, the term "target screen" may mean a screen area expected to include information about a product or content of interest to the user. For example, when the user terminal is a mobile terminal, the screen of the mobile terminal may be extracted as the target screen. When the user terminal is a laptop PC or a desktop PC, a screen displayed on the monitor thereof may be extracted as the target screen.

In this case, the user terminal may be a device that is connected to a communication network and that is capable of providing information about scrolling by the user, and may be any of various terminals, such as all data communication equipment, multimedia terminals, wired terminals, fixed terminals, and Internet Protocol (IP) terminals. For example, the user terminal may also be any of mobile terminals having various mobile communication specifications, such as a mobile phone, a Portable Multimedia Player (PMP), a Mobile Internet Device (MID), a smart phone, a tablet PC, a notebook computer, a Netbook, a Personal Digital Assistant (PDA), a smart TV, and data communication equipment.

Here, the scrolling speed may be calculated in consideration of pixels indicating the target screen and the time required to display the target screen. That is, the scrolling speed may be represented in units of pixels per second (sec).

The display screen at the point at which the scrolling speed is decreased to a preset reference speed or less may be extracted as the target screen.

Generally, each product or content list may be arranged in the form of a typical list or a grid-shaped Graphical User Interface (GUI). In this case, products or pieces of content arranged in each list may be searched while the user is scrolling the screen of the user terminal. It may be determined that a product of interest to the user is present in a portion in which the user temporarily stops scrolling or scrolls slowly, and a display screen in the corresponding portion may be extracted as the target screen.

That is, even if the user does not personally click specific content or a specific product to view the details thereof, and does not post reviews of the content or product, the product or content on which the gaze of the user is temporarily fixed is determined to be information of potential interest to the user.

Here, the preset reference speed may be freely defined based on the usual scroll pattern of the user. Alternatively, the preset reference speed may be defined differently depending on the type of product list or content list to be displayed on the user terminal.

For example, assuming that a product list composed of pictures of products and a content list composed of text are present, it is predicted that the product list that can be easily viewed at a glance is more rapidly scrolled than the content list, and the reference speed of the product list may be set to a speed higher than that of the content list.

When the scrolling speed is 0, the behavior pattern of the user may be analyzed based on at least one sensor included in the user terminal.

Here, whether to extract a display screen as the target screen may be determined based on the behavior pattern.

For example, when the user performs another task without turning off a display screen while searching a product list on a smart phone, a product or content of interest to the user may not be included in the corresponding display screen even if the scrolling speed is 0. Therefore, in order to filter out such meaningless data, when the scrolling speed is 0, the behavior pattern of the user may be analyzed, and a target screen may be extracted only if it is determined that the user gazes at the display screen of the user terminal.

At this time, the at least one sensor may include at least one of an acceleration sensor, a gyro sensor, a proximity sensor, an illuminance sensor, and a screen change sensor.

For example, when the user terminal is a smart phone, if a rapid change in the tilting of the user terminal is sensed based on the acceleration sensor and the gyro sensor, the behavior pattern may be analyzed as indicating that the user has put down the smart phone, i.e. released it from his or her hand, or is moving with the smart phone in his or her hand. That is, even if the scrolling speed is 0, there is a high probability that the user is not actually viewing the product or content list, and thus it may be determined not to extract the target screen in that case.

As another example, when the user terminal is a smart phone, if it is sensed that a certain object is approaching the display screen of the smart phone based on the proximity sensor, the behavior pattern may be analyzed as indicating that the user is engaged in a telephone conversion or has placed the smart phone in his or her pocket or bag. Even in this case, there is a high probability that the user is not actually viewing the screen of the smart phone, and thus it may be determined not to extract a target screen.

As a further example, when the change of the screen of the user terminal from the product or content list to another application screen is sensed or when the termination of the screen of the user terminal is sensed based on the screen change sensor, it may be determined not to extract a target screen. At this time, the screen change may also be sensed on the user terminal without requiring a separate screen change sensor.

Next, the interest information analysis method using a scroll pattern according to the embodiment of the present invention calculates the degree of interest in content information included in the target screen in consideration of multiple split screens corresponding to the target screen and a user touch area at step S120.

Here, the term "user touch area" may mean a location touched by the user to scroll the corresponding list when the user terminal is a smart phone. For example, in order to scroll down the screen displayed on the smart phone, a touch screen may be dragged in the direction from above to below, and an area defined by the entire drag track at that time may be determined to be the user touch area.

Here, since the user touch area is generally hidden by a finger or a touched portion, it may be difficult to determine that the user is currently viewing information displayed in the user touch area.

Therefore, in order to determine which type of content, among various types of content information included in the target screen, is of interest to the user, the user touch area may be taken into consideration.

Here, respective interest scores are assigned to multiple valid split screens which do not correspond to the user touch area, among the multiple split screens, and the degree of interest may be calculated based on the interest score corresponding to at least one valid split screen that includes content information, among the multiple valid split screens.

For example, if it is assumed that the display screen of a smart phone is divided into 10 split screens in a horizontal direction, and a drag input is sensed in four lower split screens, six upper split screens may be classified as valid split sections.

Here, interest scores are based on the gaze of the user, and a higher score may be assigned to the location on which the gaze of the user is expected to be chiefly fixed.

"Content information" may be an area including details of products or content on the target screen. Therefore, the content information may be included in at least one of the split screens of the user terminal, and the degree of interest corresponding to the content information may be calculated based on the interest scores of the split screens including the content information.

For example, it may be assumed that, among split screens of a smart phone, obtained by dividing the display screen of the smart phone into 10 split screens in a horizontal direction, six upper split screens ranging from split screens No. 1 to No. 6 are valid split screens, and that scores of 10 points are assigned to respective valid split screens No. 1 and No. 2, scores of 20 points are assigned to respective valid split screens No. 3 and No. 4, and scores of 10 points are assigned to respective valid split screens No. 5 and No. 6. In this case, if information about product A is included in the valid split screen No. 3, the degree of interest in product A may be '20'.

In this regard, when content information is simultaneously included in two or more valid split screens, among the multiple valid split screens, the ratios of a content area to two or more respective valid split screens may be calculated, and the degree of interest may be calculated by summing values that are obtained by multiplying the content area ratios by interest scores for two or more respective valid split screens.

For example, in the above example, it may be assumed that 40% of the information about product B is located in the valid split screen No. 2 and the remaining 60% thereof is located in the valid split screen No. 3. At this time, the degree of interest in product B may be calculated as (10*0.4)+(20*0.6), that is, 16.

In this case, the highest score may be assigned to a valid split screen located at the center of the multiple valid split screens, and higher scores may be assigned to valid split screens which are closer to the valid split screen located at the center.

Generally, it may be expected that when persons view smart phones or the monitors of computers, they keep their eyes on the center portion thereof rather than on the uppermost or lowermost portion thereof. Therefore, there is a high probability that each user will fix his or her gaze on the valid split screen located at the center, among the valid split screens, and thus the highest interest score may be assigned to the valid split screen at the center.

Further, a relatively low interest score is assigned to a valid split screen located in the uppermost or lowermost portion, among the valid split screens, and thus the degrees of interest in various types of content information included in the same target screen may be more precisely calculated.

In this case, the target screen is divided in conformity with the preset number of divisions according to the size of the display of the user terminal, but such division may be performed in the direction perpendicular to a scroll direction.

For example, when the same product list is individually displayed on a smart phone and on a monitor connected to a desktop PC, the number of products displayed on the screen may differ. That is, if information about only a maximum of five products is displayed on the smart phone, information about a maximum of 15 products may be displayed on the monitor. Therefore, if the screens of the smart phone and the monitor are divided into the same number of split screens, the amount of information included in a single split screen on the smart phone and the amount of information included in a single split screen on the monitor differ from each other, thus making it difficult to consistently calculate the degrees of interest.

In order to solve this problem, the actual size of each screen on which information is to be displayed is checked based on the model name or the like of the user terminal, and the appropriate number of divisions is preset according to each screen size, after which screen division may be performed.

The ratios of the split screens to the display sizes may be calculated so that the respective split screens resulting from screen division include a similar amount of information, and thus the appropriate number of divisions may be preset.

For example, assuming that, when the display screen of the smart phone is divided into 10 split screens, a single split screen includes two pieces of content information, the number of divisions may be suitably set for the monitor such that each split screen on the monitor may include two pieces of content information.

In this case, when the user terminal is a terminal that does not support a touch input, the highest interest score may be assigned to a split screen located at the center, among multiple split screens, and higher interest scores may be assigned to split screens which are closer to the split screen located at the center.

That is, on a terminal that does not support a touch input, there is no area hidden due to touch input, and thus the entire display screen is determined to correspond to valid split screens, and interest scores may be assigned to all split screens.

In this regard, the interest scores may be assigned such that, in the same way as in the above description, the highest interest score is assigned to a split screen located at the center because it is expected that the user's gaze is chiefly fixed on the center split screen. Further, it may be expected that a probability of the user's gaze being fixed on the split screens in the direction from the center split screen to a split screen located in an uppermost or lowermost portion is low, and then gradually decreased scores may be assigned to the corresponding split screens.

For example, if it is assumed that the monitor of the desktop PC is divided into 15 split screens in a horizontal direction, an interest score of 20 points may be assigned to a center split screen located at an eighth position from the top of the monitor, an interest score of 15 points may be assigned to each of sixth, seventh, ninth, and tenth split screens, which are adjacent to the eighth split screen, an interest score of 10 points may be assigned to each of fourth, fifth, eleventh, and twelfth split screens, which are spaced slightly apart from the eighth split screen, an interest score of 5 points may be assigned to each of second, third, thirteenth, and fourteenth split screens, which are located far away from the eighth split screen, and an interest score of 0 points may be assigned to each of first and fifteenth split screens, which are located in uppermost and lowermost portions, respectively.

Further, the interest information analysis method using a scroll pattern according to the embodiment of the present invention analyzes information about interest of the user by arranging multiple pieces of content information acquired from the user terminal based on the degree of interest at step S130.

Here, the degree of interest may be represented by points corresponding to interest scores. Therefore, multiple pieces of content information may be arranged in descending order based on the degree of interest, and thus the pieces of content information may be arranged and provided in the sequence of content information of higher interest to the user.

Furthermore, multiple pieces of content information may also be classified for respective fields, and pieces of interest information, arranged again in descending order based on the degree of interest in each classified field, may be provided.

In addition, multiple pieces of content information may also be classified according to date, and pieces of interest information may be analyzed and provided for respective dates.

By means of these procedures, information about which product is of recent interest to the user in a specific field may be acquired, and thus services or products suitable for respective users may be provided.

By utilizing this interest information analysis method, information about interest of a user or a field of interest to the user may be analyzed without referring to a definite intention expressed by the user.

In addition, it is also possible to analyze potential interest or demand by analyzing the behavior pattern of the user, and to detect information about interests of users who avoid expressing a definite intention.

Figure 2:
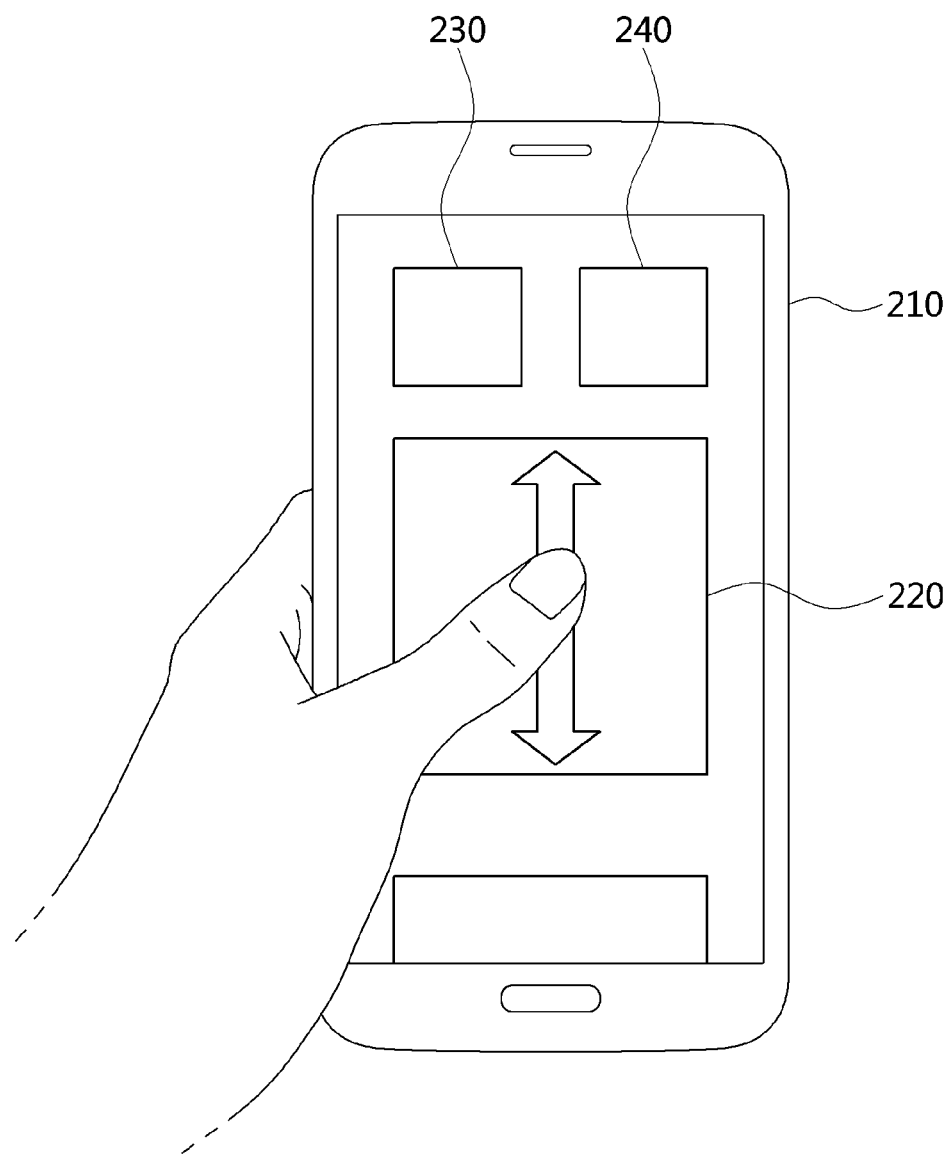
FIG. 2 is a diagram showing an example of a user terminal scroll method according to the present invention.

FIG. 2 is a diagram showing an example of a user terminal scroll method according to the present invention.

Referring to FIG. 2, on a user terminal 210 that supports a touch input to be made by hand, a user touch area when a display screen is scrolled with a finger, that is, a drag area, may be checked.

Generally, each product or content list that is to be provided to users, that is, purchasers, may be arranged in the form of a typical list or a grid-shaped GUI. Therefore, products or pieces of content arranged in each list may be searched while the user is scrolling the display screen.

For example, in order to scroll down the product list or the content list on the user terminal 210 shown in FIG. 2, the user may drag the screen using his or her finger in such a way as to slide the finger upward in an arrow region shown in FIG. 2.

In this case, since content information 220 located in a portion dragged by the user's finger is hidden by the user's finger, it may be difficult to predict that the user views the corresponding content information 220 with interest even if the scrolling speed is less than or equal to the preset reference speed.

That is, if the scrolling speed is decreased to the preset reference speed or less at the location of the display screen, such as that shown in FIG. 2, while the user is scrolling the display screen on the user terminal 210, it may be determined that the user decreases the scrolling speed so as to view content information 230 and 240 that is not hidden by the user's finger.

Here, the scrolling speed may be calculated in consideration of the pixels of the display screen and the time required to display information on the display screen.

The preset reference speed may be freely defined based on the usual scroll pattern of the user. Alternatively, the preset reference speed may be defined differently depending on the type of product list or content list to be displayed on the user terminal.

In this case, the user touch area may be extracted by sensing the location of a touch input when the user terminal is a smart phone such as that shown in FIG. 2.

Further, the user terminal 210 shown in FIG. 2 is equipped with at least one of an acceleration sensor, a gyro sensor, a proximity sensor, an illuminance sensor, and a screen change sensor, and is then capable of analyzing the behavior pattern of the user at the time of analyzing interest information when the scrolling speed is 0.

For example, when the user performs another task without turning off a display screen while searching a product list on a smart phone, a product or content of interest to the user may not be included in the corresponding display screen even if the scrolling speed is 0. Therefore, in order to filter out such meaningless data, when the scrolling speed is 0, the behavior pattern of the user may be analyzed, and a target screen may be extracted only if it is determined that the user gazes at the display screen of the user terminal.

Figure 3:
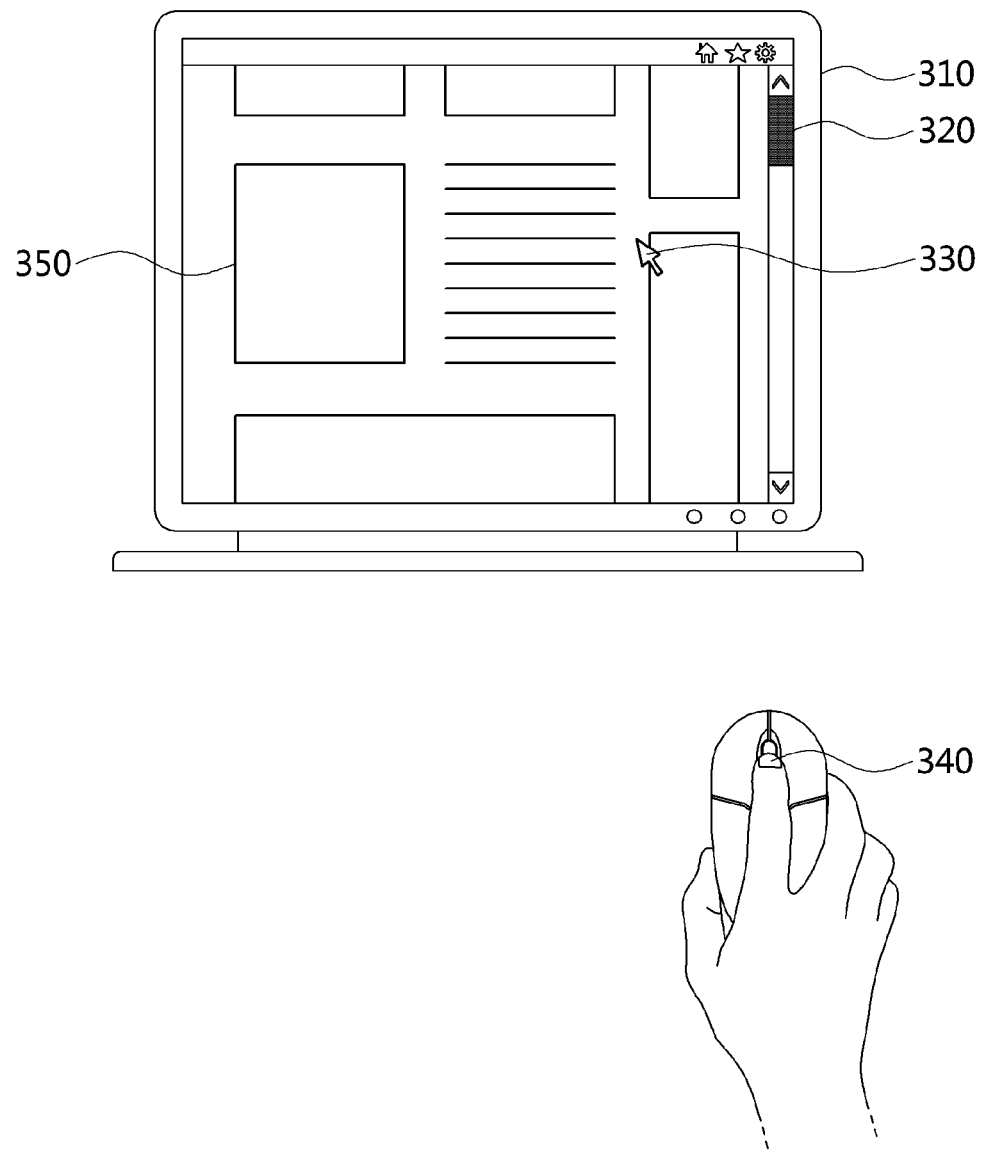
FIG. 3 is a diagram showing another example of a user terminal scroll method according to the present invention.

FIG. 3 is a diagram showing another example of a user terminal scroll method according to the present invention.

Referring to FIG. 3, it can be seen that a display screen is scrolled with a mouse 340 on a user terminal 220 that does not support a touch input made by hand, that is, a desktop PC.

In this case, on the monitor 310 of the desktop PC shown in FIG. 3, a user touch area such as that shown in FIG. 2 may not be present. That is, a portion in which content information displayed on the monitor 310 is hidden may not be present.

Therefore, when the scrolling speed is less than or equal to a preset speed, it may be predicted that the user views all content information included in the screen on which a scroll bar 320 is located.

At this time, even if a hidden portion such as that in a user touch area is not present when the user views the content information on the monitor 310 shown in FIG. 3, a portion on which the gaze of the user is chiefly fixed may be predicted.

For example, content information 350 shown in FIG. 3 is located at the center of the monitor, and the entire portion of the content information 350 is shown without any portion of the content information 350 moving off the screen of the monitor 310 or being hidden. That is, it may be predicted that there is a high probability that the gaze of the user is fixed on the center content information 350 rather than on pieces of content information located in the upper and lower portions of the monitor 310.

Further, it may also be determined that, among pieces of content information displayed on the monitor 310, content information present in a portion where a mouse cursor 330 is located is content information viewed by the user with interest.

Figure 4:
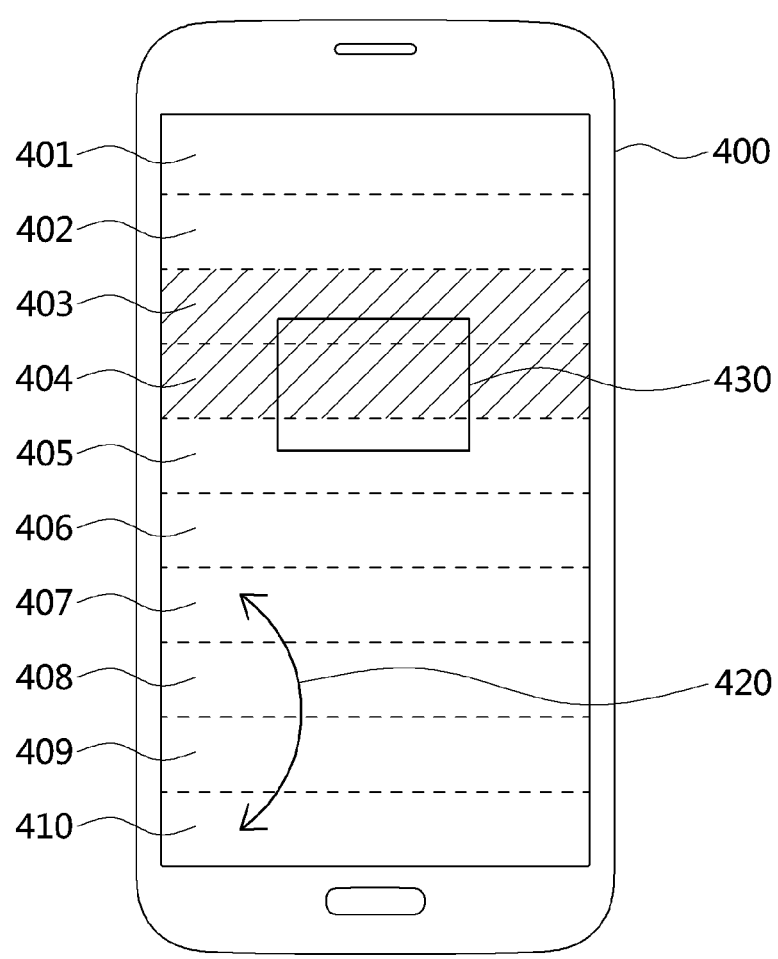
FIG. 4 is a diagram showing an example of split screens according to the present invention.

FIG. 4 is a diagram showing an example of split screens according to the present invention.

Referring to FIG. 4, it can be seen that the display screen of a user terminal 400 is divided into 10 split screens 401 to 410.

Here, the division ratios of the split screens 401 to 410 may be identical to each other.

The direction in which the display screen is divided may be the direction perpendicular to a scroll direction on the user terminal 400, that is, a horizontal direction in FIG. 4.

Among the split screens 401 to 410 shown in FIG. 4, valid split screens may be six split screens 401 to 406, which do not belong to a user touch area 420.

That is, since the split screens 407 to 410 which are located in the user touch area 420 are portions hidden by the user's finger making a touch input, it may be difficult to consider that the split screens 407 to 410 correspond to actual locations where content information is intended to be viewed.

Therefore, in the case of the user terminal 400 shown in FIG. 4, interest scores may be assigned only to the six split screens 401 to 406 that correspond to valid split screens.

Here, among the split screens 401 to 406 corresponding to the valid split screens, the highest interest scores may be assigned to the two split screens 403 and 404 located at the center. For example, assuming that scores of 10 points are assigned to the respective split screens 403 and 404, scores of 8 points may be assigned to the respective split screens 402 and 405, and scores of 6 points may be assigned to the remaining split screens 401 and 406.

That is, the highest interest score may be assigned to the location on which the gaze of the user is most likely to be fixed, and higher interest scores may be assigned to locations which are closer to that location. In this way, it may be possible to more precisely analyze the degree of the user's interest by assigning different interest scores to split screens resulting from division of the same target screen.

In this case, the degree of interest in content information may be calculated in accordance with the interest scores assigned to the respective split screens 401 to 406.

For example, as shown in the above illustration, it may be assumed that interest scores of 10 points are assigned to the respective split screens 403 and 404, interest scores of 8 points are assigned to the respective split screens 402 and 405, and interest scores of 6 points are assigned to the remaining split screens 401 and 406.

Although not shown in FIG. 4, if content information A is located so as to be included only in the split screen 403, the degree of interest in the content information A may be '10,' which corresponds to the interest score of the split screen 403.

Further, as shown in FIG. 4, when the content information 430 is located throughout the split screen 403, the split screen 404, and the split screen 405, the degree of interest in the content information may be calculated in consideration of the ratios of the content information 430 to respective split screens (percentages at which the content information 430 is included in the respective split screens), that is, content area ratios according to the present invention.

If it is assumed that the content area ratios of the content information 430 are 10% for the split screen 403, 75% for the split screen 404, and 15% for the split screen 405, respectively, the degree of interest in the content information 430 may be calculated as (10*0.1)+(10*0.75)+(8*0.15)=9.7.

That is, the degree of interest may be '9.7' which is the sum of '1', which is obtained by multiplying an interest score of 10 points for the split screen 403 by the content area ratio of 10% for the split screen 403, '7.5', which is obtained by multiplying an interest score of 10 points for the split screen 404 by the content area ratio of 75% for the split screen 404, and '1.2', which is obtained by multiplying an interest score of 8 points for the split screen 405 by the content area ratio of 15% for the split screen 405.

Figure 5:
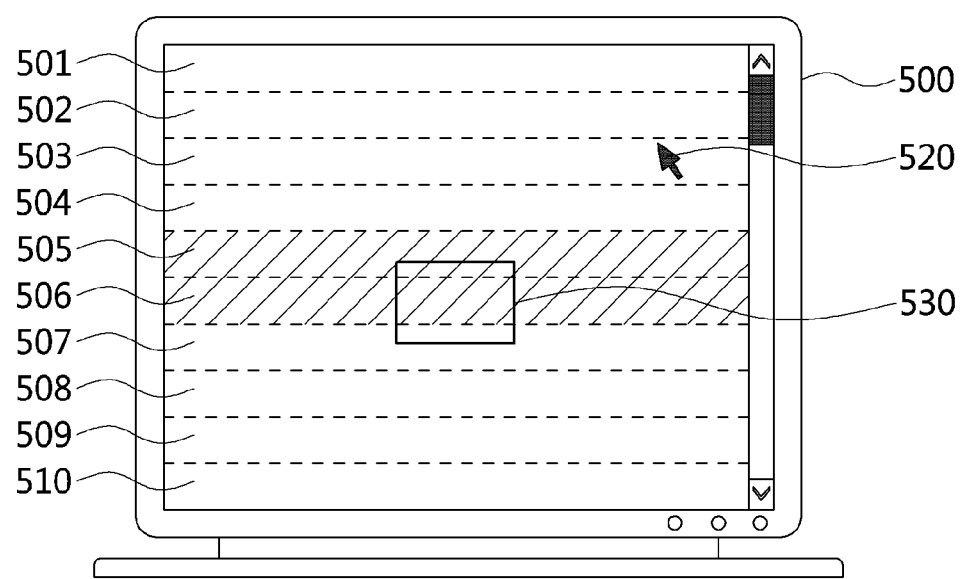
FIG. 5 is a diagram showing another example of split screens according to the present invention.

FIG. 5 is a diagram showing another example of split screens according to the present invention.

Referring to FIG. 5, it can be seen that the display screen of a user terminal 500 is divided into 10 split screens 501 to 510.

Here, the user terminal 500 may be a terminal that does not support touch input. The user terminal 500 may be assumed to be, for example, a desktop PC or a notebook.

The division ratios of the split screens 501 to 510 are identical to each other, and the direction of division may be the direction perpendicular to the scroll direction on the user terminal 500.

Here, since a user touch area is not present in the split screens 501 to 510 shown in FIG. 5, all of the split screens 501 to 510 may be determined to be valid split screens. That is, interest scores may be assigned to all of the split screens 501 to 510.

Among the split screens 501 to 510, the highest interest scores may be assigned to the two split screens 505 and 506 located at the center. For example, if it is assumed that interest scores of 10 points are assigned to the respective split screens 505 and 506, interest scores of 8 points may be assigned to the respective split screens 504 and 507, interest scores of 6 points may be assigned to the respective split screens 503 and 508, interest scores of 4 points may be assigned to the respective split screens 502 and 509, and interest scores of 2 or 0 points may be assigned to the remaining split screens 501 and 510.

Since the split screen 501 located in an uppermost portion and the split screen 510 located in a lowermost portion are portions in which pieces of information about pages showing a product list, rather than content information, are actually displayed, a very low interest score may be assigned thereto.

Even in the case of the user terminal 500 shown in FIG. 5, the degree of interest in content information 530 may also be calculated using the same method as that of the user terminal 400 shown in FIG. 4.

That is, assuming that the content area ratios of the content information 530 are 10% for the split screen 505, 75% for the split screen 506, and 15% for the split screen 507, respectively, the degree of interest in the content information 530 may be calculated as (10*0.1)+(10*0.75)+(8*0.15)=9.7.

That is, the degree of interest may be calculated as '9.7' which is the sum of '1', which is obtained by multiplying an interest score of 10 points for the split screen 505 by the content area ratio of 10% for the split screen 505, '7.5', which is obtained by multiplying an interest score of 10 points for the split screen 506 by the content area ratio of 75% for the split screen 506, and '1.2', which is obtained by multiplying an interest score of 8 points for the split screen 507 by the content area ratio of 15% for the split screen 507.

Since the user terminal 500 shown in FIG. 5 has a display screen, the size of which is different from that of the user terminal 400 shown in FIG. 4, the display screen of the user terminal 500 shown in FIG. 5 must be divided into a greater number of split screens than that of the user terminal 400 if the size at which the content information 430 shown in FIG. 4 is actually displayed is identical to the size at which the content information 530 is actually displayed.

However, since, on the user terminal 400 shown in FIG. 4 and the user terminal 500 shown in FIG. 5, the display screens are divided into the same number of split screens, it may be assumed that the size at which the content information 530 is actually displayed is greater than the size at which the content information 430 is actually displayed.

That is, the content information 530 may be displayed at the size larger than the content information 430 by a difference corresponding to the ratio of the display screen size of the user terminal 400 to the display screen size of the user terminal 500.

FIG. 6 is a diagram showing an example of interest information according to the present invention.

Referring to FIG. 6, it can be seen that the interest information according to the present invention is information in which pieces of content information acquired from a target screen are arrayed according to a ranking based on the degrees of interest.

That is, when the display screen of the user terminal according to the present invention is divided into multiple split screens, and interest scores are assigned to respective split screens, an interest information table 610 such as that shown in FIG. 6 may be generated based on the results of calculation of the degrees of interest corresponding to the interest scores of the split screens which include content information.

For example, in the interest information table 610 shown in FIG. 6, pieces of content information may be arranged in descending order based on the degrees of interest. That is, it may be determined that content information having a higher rank is information of higher interest to the user.

Further, assuming that an enterprise that provides products generates the interest information table 610 shown in FIG. 6, the interest information table may be stored such that related products that can be publicized by the corresponding enterprise match respective pieces of content information.

In this way, the interest information table 610 shown in FIG. 6 is generated and managed for each user, and thus a service, a product or content information suitable for each user may be provided.

Further, the reliability of analysis information may be improved by utilizing information in the interest information table 610 shown in FIG. 6 together with interest information analyzed based on the definite intention expressed by the user.

Figure 7:
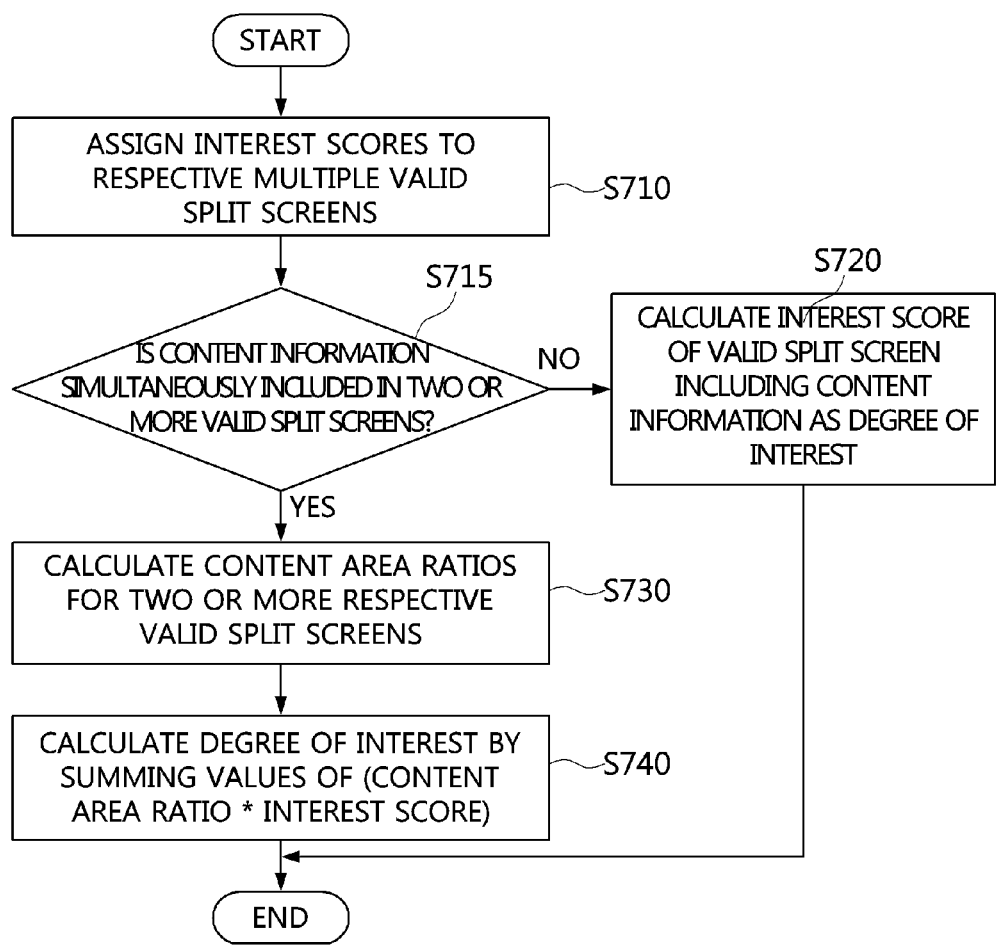
FIG. 7 is an operation flowchart showing in detail a method for calculating the degree of interest in an interest information analysis method according to an embodiment of the present invention.

FIG. 7 is an operation flowchart showing in detail a method for calculating the degree of interest in the interest information analysis method according to an embodiment of the present invention.

Referring to FIG. 7, the method for calculating the degree of interest in the interest information analysis method according to the embodiment of the present invention assigns interest scores to respective multiple valid split screens at step S710.

In this case, the multiple valid split screens may correspond to some split screens which do not belong to a user touch area, among the multiple split screens obtained by dividing the display screen of the user terminal.

At this time, since the screen area corresponding to the user touch area is generally hidden by a finger or a touched portion, it may be difficult to determine that the user is viewing information displayed in the user touch area.

Interest scores are based on the gaze of the user, and a higher score may be assigned to the location on which the gaze of the user is most likely to be chiefly fixed for a longer time.

Here, the highest score is assigned to a valid split screen located at the center, among the multiple valid split screens, and higher interest scores may be assigned to split screens which are closer to the center split screen.

Next, whether the content information is simultaneously included in two or more valid split screens is determined at step S715.

If it is determined at step S715 that the content information is not simultaneously included in two or more valid split screens, the interest score of a single valid split screen including the content information is calculated as the degree of interest in the content information at step S720.

For example, it may be assumed that, among split screens obtained by dividing the display screen of the smart phone into 10 split screens in a horizontal direction, six upper split screens ranging from No. 1 to No. 6 from the top of the display screen are valid split screens, and that interest scores of 10 points are assigned to respective split screens No. 1 and No. 2, interest scores of 20 points are assigned to respective split screens No. 3 and No. 4, and interest scores of 10 points are assigned to respective split screens No. 5 and No. 6. In this case, when information about product A is included in the valid split screen No. 3, the degree of interest in product A may be '20'.

Further, if it is determined at step S715 that the content information is simultaneously included in two or more valid split screens, content area ratios are calculated for two or more respective valid split screens that include the content information at step S730.

For example, assuming that information about product B is simultaneously included in the valid split screen No. 2 and the valid split screen No. 3, the percentage of the entire area of the content information that is included in each valid split screen may be calculated.

Thereafter, for the two or more respective valid split screens, the values of (content area ratio*interest score) are calculated, and the calculated values are summed, and thus the degree of interest in the content information is calculated at step S740.

For example, it may be assumed that, in the above illustration, 40% of information about product B is located in the valid split screen No. 2, and 60% of the information is located in the valid split screen No. 3. In this case, the degree of interest in product B may be calculated as (10*0.4)+(20*0.6), that is, 16.

In this case, the method for calculating the degree of interest shown in FIG. 7 may correspond to the case where the user terminal is a terminal that supports touch input. When the user terminal is a terminal that does not support touch input, all of the multiple split screens are determined to be valid split screens, and thus the same procedure may be performed.

Figure 8:
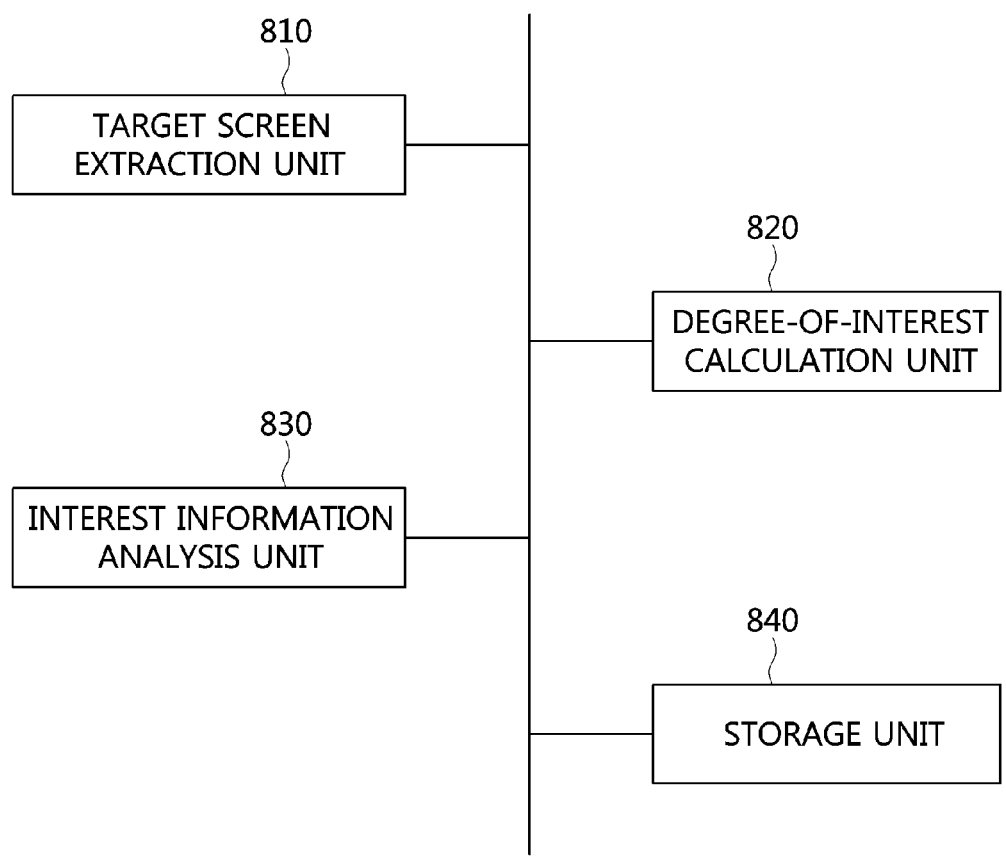
FIG. 8 is a block diagram showing an interest information analysis apparatus using a scroll pattern according to an embodiment of the present invention.

FIG. 8 is a block diagram showing an interest information analysis apparatus using a scroll pattern according to an embodiment of the present invention.

Generally, in order to provide customized service to each user, information about a product or content of interest to a user may be collected from the computer or mobile device of the user. This collection technology is intended to provide the product or content having a probability of being of interest to the user based on the collected information. Recently, most service providers have come to utilize this technology.

That is, this is intended to collect information about interest of the user (user interest information) and to provide a product expected to be purchased by the user. For example, it is possible to analyze the properties of content or the product stored by the user in the user terminal, collect interest information, and recommend products similar to the user interest information.

However, this technology may collect interest information only when the user expresses his or her interest. For example, as well as in the case where the information stored in the user terminal is utilized, as described above, in the case where product inquiry records are utilized or information shared on an SNS is used, or in the case where a search keyword is used, information may be collected only when the user expresses his or her interest.

Therefore, it may be difficult to precisely provide such a service to a user who avoids positively expressing his or her interest. Further, there is a limitation in that, even if the user does not positively express his or her interest, it is impossible to collect information of potential interest.

In order to solve this problem, the present invention is intended to present an apparatus for analyzing information about content or a product of potential interest to the user by analyzing a scroll pattern while the user is viewing a content or product list.

Referring to FIG. 8, the interest information analysis apparatus using a scroll pattern according to the embodiment of the present invention includes a target screen extraction unit 810, a degree-of-interest calculation unit 820, an interest information analysis unit 830, and a storage unit 840.

The target screen extraction unit 810 extracts a target screen from the user terminal in consideration of scrolling speed.

Here, the term "target screen" may mean a screen area expected to include information about a product or content of interest to the user. For example, when the user terminal is a mobile terminal, the screen of the mobile terminal may be extracted as the target screen. When the user terminal is a laptop PC or a desktop PC, a screen displayed on the monitor thereof may be extracted as the target screen.

In this case, the user terminal may be a device that is connected to a communication network and that is capable of providing information about scrolling by the user, and may be any of various terminals, such as all data communication equipment, multimedia terminals, wired terminals, fixed terminals, and Internet Protocol (IP) terminals. For example, the user terminal may also be any of mobile terminals having various mobile communication specifications, such as a mobile phone, a Portable Multimedia Player (PMP), a Mobile Internet Device (MID), a smart phone, a tablet PC, a notebook computer, a Netbook, a Personal Digital Assistant (PDA), a smart TV, and data communication equipment.

Here, the scrolling speed may be calculated in consideration of pixels indicating the target screen and the time required to display the target screen. That is, the scrolling speed may be represented in units of pixels per second (sec).

The display screen at the point at which the scrolling speed is decreased to a preset reference speed or less may be extracted as the target screen.

Generally, each product or content list may be arranged in the form of a typical list or a grid-shaped Graphical User Interface (GUI). In this case, products or pieces of content arranged in each list may be searched while the user is scrolling the screen of the user terminal. It may be determined that a product of interest to the user is present in a portion in which the user temporarily stops scrolling or scrolls slowly, and a display screen in the corresponding portion may be extracted as the target screen.

That is, even if the user does not personally click specific content or a specific product to view the details thereof, and does not post reviews of the content or product, the product or content on which the gaze of the user is temporarily fixed is determined to be information of potential interest to the user.

Here, the preset reference speed may be freely defined based on the usual scroll pattern of the user. Alternatively, the preset reference speed may be defined differently depending on the type of product list or content list to be displayed on the user terminal.

For example, assuming that a product list composed of pictures of products and a content list composed of text are present, it is predicted that the product list that can be easily viewed at a glance is more rapidly scrolled than the content list, and the reference speed of the product list may be set to a speed higher than that of the content list.

When the scrolling speed is 0, the behavior pattern of the user may be analyzed based on at least one sensor included in the user terminal.

Here, whether to extract a display screen as the target screen may be determined based on the behavior pattern.

For example, when the user performs another task without turning off a display screen while searching a product list on a smart phone, a product or content of interest to the user may not be included in the corresponding display screen even if the scrolling speed is 0. Therefore, in order to filter out such meaningless data, when the scrolling speed is 0, the behavior pattern of the user may be analyzed, and a target screen may be extracted only if it is determined that the user gazes at the display screen of the user terminal.

At this time, the at least one sensor may include at least one of an acceleration sensor, a gyro sensor, a proximity sensor, an illuminance sensor, and a screen change sensor.

For example, when the user terminal is a smart phone, if a rapid change in the tilting of the user terminal is sensed based on the acceleration sensor and the gyro sensor, the behavior pattern may be analyzed as indicating that the user has put down the smart phone, i.e. released it from his or her hand, or is moving with the smart phone in his or her hand. That is, even if the scrolling speed is 0, there is a high probability that the user is not actually viewing the product or content list, and thus it may be determined not to extract the target screen in that case.

As another example, when the user terminal is a smart phone, if it is sensed that a certain object is approaching the display screen of the smart phone based on the proximity sensor, the behavior pattern may be analyzed as indicating that the user is engaged in a telephone conversion or has placed the smart phone in his or her pocket or bag. Even in this case, there is a high probability that the user is not actually viewing the screen of the smart phone, and thus it may be determined not to extract a target screen.

As a further example, when the change of the screen of the user terminal from the product or content list to another application screen is sensed or when the termination of the screen of the user terminal is sensed based on the screen change sensor, it may be determined not to extract a target screen. At this time, the screen change may also be sensed on the user terminal without requiring a separate screen change sensor.

The degree-of-interest calculation unit 820 calculates the degree of interest in content information included in the target screen in consideration of multiple split screens corresponding to the target screen and a user touch area.

The term "user touch area" may mean a location touched by the user to scroll the corresponding list when the user terminal is a smart phone. For example, in order to scroll down the screen displayed on the smart phone, a touch screen may be dragged in the direction from above to below, and an area defined by the entire drag track at that time may be determined to be the user touch area.

Here, since the user touch area is generally hidden by a finger or a touched portion, it may be difficult to determine that the user is currently viewing information displayed in the user touch area.

Therefore, in order to determine which type of content, among various types of content information included in the target screen, is of interest to the user, the user touch area may be taken into consideration.

Here, respective interest scores are assigned to multiple valid split screens which do not correspond to the user touch area, among the multiple split screens, and the degree of interest may be calculated based on the interest score corresponding to at least one valid split screen that includes content information, among the multiple valid split screens.

For example, if it is assumed that the display screen of a smart phone is divided into 10 split screens in a horizontal direction, and a drag input is sensed in four lower split screens, six upper split screens may be classified as valid split sections.

Here, interest scores are based on the gaze of the user, and a higher score may be assigned to the location on which the gaze of the user is expected to be chiefly fixed.

"Content information" may be an area including details of products or content on the target screen. Therefore, the content information may be included in at least one of the split screens of the user terminal, and the degree of interest corresponding to the content information may be calculated based on the interest scores of the split screens including the content information.

For example, it may be assumed that, among split screens of a smart phone, obtained by dividing the display screen of the smart phone into 10 split screens in a horizontal direction, six upper split screens ranging from split screens No. 1 to No. 6 are valid split screens, and that scores of 10 points are assigned to respective valid split screens No. 1 and No. 2, scores of 20 points are assigned to respective valid split screens No. 3 and No. 4, and scores of 10 points are assigned to respective valid split screens No. 5 and No. 6. In this case, if information about product A is included in the valid split screen No. 3, the degree of interest in product A may be '20'.

In this regard, when content information is simultaneously included in two or more valid split screens, among the multiple valid split screens, the ratios of a content area to two or more respective valid split screens may be calculated, and the degree of interest may be calculated by summing values that are obtained by multiplying the content area ratios by interest scores for two or more respective valid split screens.

For example, in the above example, it may be assumed that 40% of the information about product B is located in the valid split screen No. 2 and the remaining 60% thereof is located in the valid split screen No. 3. At this time, the degree of interest in product B may be calculated as (10*0.4)+(20*0.6), that is, 16.

In this case, the highest score may be assigned to a valid split screen located at the center of the multiple valid split screens, and higher scores may be assigned to valid split screens which are closer to the valid split screen located at the center.

Generally, it may be expected that when persons view smart phones or the monitors of computers, they keep their eyes on the center portion thereof rather than on the uppermost or lowermost portion thereof. Therefore, there is a high probability that each user will fix his or her gaze on the valid split screen located at the center, among the valid split screens, and thus the highest interest score may be assigned to the valid split screen at the center.

Further, a relatively low interest score is assigned to a valid split screen located in the uppermost or lowermost portion, among the valid split screens, and thus the degrees of interest in various types of content information included in the same target screen may be more precisely calculated.

In this case, the target screen is divided in conformity with the preset number of divisions according to the size of the display of the user terminal, but such division may be performed in the direction perpendicular to a scroll direction.

For example, when the same product list is individually displayed on a smart phone and on a monitor connected to a desktop PC, the number of products displayed on the screen may differ. That is, if information about only a maximum of five products is displayed on the smart phone, information about a maximum of 15 products may be displayed on the monitor. Therefore, if the screens of the smart phone and the monitor are divided into the same number of split screens, the amount of information included in a single split screen on the smart phone and the amount of information included in a single split screen on the monitor differ from each other, thus making it difficult to consistently calculate the degrees of interest.

In order to solve this problem, the actual size of each screen on which information is to be displayed is checked based on the model name or the like of the user terminal, and the appropriate number of divisions is preset according to each screen size, after which screen division may be performed.

The ratios of the split screens to the display sizes may be calculated so that the respective split screens resulting from screen division include a similar amount of information, and thus the appropriate number of divisions may be preset.

For example, assuming that, when the display screen of the smart phone is divided into 10 split screens, a single split screen includes two pieces of content information, the number of divisions may be suitably set for the monitor such that each split screen on the monitor may include two pieces of content information.

In this case, when the user terminal is a terminal that does not support a touch input, the highest interest score may be assigned to a split screen located at the center, among multiple split screens, and higher interest scores may be assigned to split screens which are closer to the split screen located at the center.

That is, on a terminal that does not support a touch input, there is no area hidden due to touch input, and thus the entire display screen is determined to correspond to valid split screens, and interest scores may be assigned to all split screens.

In this regard, the interest scores may be assigned such that, in the same way as in the above description, the highest interest score is assigned to a split screen located at the center because it is expected that the user's gaze is chiefly fixed on the center split screen. Further, it may be expected that a probability of the user's gaze being fixed on the split screens in the direction from the center split screen to a split screen located in an uppermost or lowermost portion is low, and then gradually decreased scores may be assigned to the corresponding split screens.

For example, if it is assumed that the monitor of the desktop PC is divided into 15 split screens in a horizontal direction, an interest score of 20 points may be assigned to a center split screen located at an eighth position from the top of the monitor, an interest score of 15 points may be assigned to each of sixth, seventh, ninth, and tenth split screens, which are adjacent to the eighth split screen, an interest score of 10 points may be assigned to each of fourth, fifth, eleventh, and twelfth split screens, which are spaced slightly apart from the eighth split screen, an interest score of 5 points may be assigned to each of second, third, thirteenth, and fourteenth split screens, which are located far away from the eighth split screen, and an interest score of 0 points may be assigned to each of first and fifteenth split screens, which are located in uppermost and lowermost portions, respectively.

The interest information analysis unit 830 analyzes information about interest of the user by arranging multiple pieces of content information acquired from the user terminal based on the degree of interest.

Here, the degree of interest may be represented by points corresponding to interest scores. Therefore, multiple pieces of content information may be arranged in descending order based on the degree of interest, and thus the pieces of content information may be arranged and provided in the sequence of content information of higher interest to the user.

Furthermore, multiple pieces of content information may also be classified for respective fields, and pieces of interest information, arranged again in descending order based on the degree of interest in each classified field, may be provided.

In addition, multiple pieces of content information may also be classified according to date, and pieces of interest information may be analyzed and provided for respective dates.

By means of these procedures, information about which product is of recent interest to the user in a specific field may be acquired, and thus services or products suitable for respective users may be provided.

As described above, the storage unit 840 stores various types of information generated in the interest information analysis procedure according to the embodiment of the present invention.

In accordance with an embodiment, the storage unit 840 may be configured independently of the interest information analysis apparatus and may then support a function for interest information analysis. Here, the storage unit 840 may function as separate large-capacity storage, and may include a control function for performing operations.

Meanwhile, the interest information analysis apparatus may be equipped with memory and may store information therein. In an embodiment, the memory is a computer-readable medium. In an embodiment, the memory may be a volatile memory unit, and in another embodiment, the memory may be a nonvolatile memory unit. In an embodiment, a storage device is a computer-readable medium. In various different embodiments, the storage device may include a hard disk device, an optical disk device, or any type of large-capacity storage device.

By means of this interest information analysis apparatus, information about interest of each user or a field of interest to the user may be analyzed without referring to a definite intention expressed by the user.

Further, potential interest or demand may be analyzed by analyzing the behavior pattern of the user, and information about interests of users who avoid expressing a definite intention may be detected.

As described above, those skilled in the art to which the present invention pertains will appreciate that the present invention may be practiced in other detailed forms without changing the technical spirit or essential features thereof. Therefore, the above-described embodiments should be understood to be exemplary in all aspects, rather than being restrictive.

For example, the interest information analysis apparatus or the user terminal according to the present invention may store information in memory. In an embodiment, the memory is a computer-readable medium. In an embodiment, the memory may be a volatile memory unit, and in another embodiment, the memory may be a nonvolatile memory unit. Further, the memory may include, for example, a hard disk device, an optical disk device, or any type of large-capacity storage device.

The interest information analysis apparatus or the user terminal may include, as external input/output devices, one or more network interface devices such as an Ethernet card, a serial communication device such as an RS-232 port, and/or a wireless interface device such as an 802.11 card. In another embodiment, such an input/output device may include driver devices, for example, a keyboard, a printer, and a display device, configured to transmit output data and receive input data to and from other input/output devices.

The interest information analysis apparatus or the user terminal may be realized in response to commands for allowing one or more processing devices to perform the above-described functions and processes when the commands are executed. For example, such commands may include interpretive commands such as script commands, for example, JavaScript or ECMAScript commands, or executable code or other commands stored in a computer-readable medium.

The interest information analysis apparatus or the user terminal according to the present specification may be implemented either in a distributed form over a network, as in the case of a server farm, or on a single computer device.

Embodiments for realizing functional operations and the subject matter described in the present specification may be implemented as a digital electronic circuit or may be implemented as computer software, firmware or hardware which includes structures disclosed in the present specification and equivalents thereof or as a combination of one or more thereof. Embodiments of the subject matter described in the present specification may be implemented as one or more computer program products, that is, one or more modules related to computer program instructions encoded in a tangible program storage medium to control the operation of a processing system or for being executed by the same.

The computer-readable medium may be a machine-readable storage device, a machine-readable storage board, a memory device, or a composite of materials influencing machine-readable radio waveform signals, or a combination of one or more thereof.

In the present specification, the term 'system' or 'apparatus' may include any of all instruments, appliances, and machines that include, for example, a programmable processor, a computer, a multi-processor or a computer and that are intended to process data. The processing system may include code for forming an execution environment for a computer program in response to a request in addition to hardware, for example, code constituting processor firmware, a protocol stack, a database management system or an operating system, or a combination of one or more thereof.

A computer program (also known as a program, software, a software application, a script or code) may be created in any type of programming language including a compiled or interpreted language or a priori or procedural language, and may also be developed in any type including an independent program, a module, a component, a subroutine or another unit suitable for use in a computer environment. The computer program does not necessarily correspond to a file in a file system. The program may be stored in a single file provided to a requested program, or in multiple interactive files (e.g. one or more modules, sub-programs or files for storing a part of code), or in a part of a file which contains additional programs or data (e.g. one or more scripts stored in a markup language document). The computer program may be located in a single site or may be distributed over a plurality of sites, and may be developed to be executed on multiple computers mutually connected to each other over a communication network or on a single computer.

Meanwhile, examples of a suitable computer-readable medium for storing computer program instructions and data may include all types of nonvolatile memory, media, and memory devices, which include a semiconductor memory device such as Erasable Programmable Read-Only Memory (EPROM), Electrically Erasable Programmable ROM (EE-PROM) or a flash memory device, a magnetic disk such as an internal hard disk or an external disk, a magneto-optical disk, a Compact Disk (CD)-ROM, and a Digital Versatile Disk (DVD)-ROM. The processor and memory may be supplemented or integrated with a special-purpose logic circuit.

The interest information analysis method according to the present invention may be implemented as program instructions that can be executed by various computer means, and the program instructions may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine language code, such as code created by a compiler, and high-level language code executable by a computer using an interpreter. The hardware devices may be configured to operate as one or more software modules in order to perform the operation of the present invention, and vice versa.

In accordance with the present invention, provided is a method for analyzing information or a field of interest to a user without referring to a definite intention expressed by the user.

Further, the present invention may provide a method for analyzing potential interest or potential demand by analyzing the behavior pattern of a user.

Furthermore, the present invention may provide a method for detecting information about interests of users who avoid expressing a definite intention.

In accordance with the present invention, the present invention may extract a target screen from a user terminal in consideration of scrolling speed, may calculate the degree of interest in content information included in the target screen in consideration of multiple split screens corresponding to the target screen and a user touch area, and may analyze user interest information by arranging multiple pieces of content information acquired from the user terminal based on the degree of interest. Furthermore, the present invention may analyze potential interest or demand by analyzing the behavior pattern of each user, thus recommending products suitable for each user.

As described above, in the interest information analysis method using a scroll pattern and the apparatus using the method according to the present invention, the configurations and schemes in the above-described embodiments are not limitedly applied, and some or all of the above embodiments can be selectively combined and configured so that various modifications are possible.

What is claimed is:

1. An interest information analysis method using a scroll pattern, comprising:
   extracting, by one or more processors, a target screen displayed at a time on a display device of a user terminal in consideration of a scrolling speed of content information on the display device;
   determining, by the one or more processors, distribution of the content information in the target screen among multiple split screens that divide a display area of the display device in a predefined manner;
   determining, by the one or more processors, a degree of interest in the content information based on one or more interest scores assigned to one or more of the multiple split screens in which the content information appears; and
   analyzing, by the one or more processors, the user's interest on multiple pieces of content information including the content information determined degree of interest in the content information, and
   wherein the target screen is extracted by:
      when the scrolling speed is 0, analyzing a behavior pattern of the user based on at least one sensor included in the user terminal; and
      determining whether to extract the display screen as the target screen based on the behavior pattern.

2. The interest information analysis method of claim 1, wherein the degree of interest in the content information is determined by:
   when the content information appears in two or more of the multiple split screens, determining content area ratios for the two or more of the multiple split screens, and
   summing values obtained by multiplying the content area ratios by respective interest scores assigned to the two or more of the multiple split screens in which the content information appears.

3. The interest information analysis method of claim 1, wherein calculating the degree of interest causes a highest interest score be assigned to one of the multiple split screens located at a center of the display device.

4. The interest information analysis method of claim 1, wherein the multiple split screens of the display device of the user terminal in a direction perpendicular to a scroll direction of the content information.

5. The interest information analysis method of claim 1, wherein the target screen is extracted when the scrolling speed of the content information is below a preset reference speed.

6. The interest information analysis method of claim 1, wherein the at least one sensor comprises at least one of an acceleration sensor, a gyro sensor, a proximity sensor, an illuminance sensor, and a screen change sensor.

7. The interest information analysis method of claim 1, wherein the degree of interest is determined by:
   when the user terminal is a terminal that does not support a touch input, assign a highest interest score to one of the multiple split screens located at a center of the display device, and
   assign higher interest scores to first split screens of the multiple split screens that are located closer to a center of the display device than second split screens of the multiple split screens that are located farther from the center of the display device.

8. An interest information analysis apparatus using a scroll pattern, comprising:
- a memory storing instructions; and
- a processor executing the instructions causing the processor to:
  - extract a target screen displayed at a time on a display device of a user terminal in consideration of a scrolling speed of content information on the display device,
  - determine distribution of the content information in the target screen among multiple split screens that divide a display area of the display device in a predefined manner,
  - determine a degree of interest in the content information based on one or more interest scores assigned to one or more of the multiple split screens in which the content information appears, and
  - analyze the user's interest on multiple pieces of content information including the content information based on the determined degree of interest in the content information,
  - wherein the target screen is extracted by:
    - when the scrolling speed is 0, analyzing a behavior pattern of the user based on at least one sensor included in the user terminal; and
    - determining whether to extract the display screen as the target screen based on the behavior pattern.

\* \* \* \* \*